UNITED STATES PATENT OFFICE.

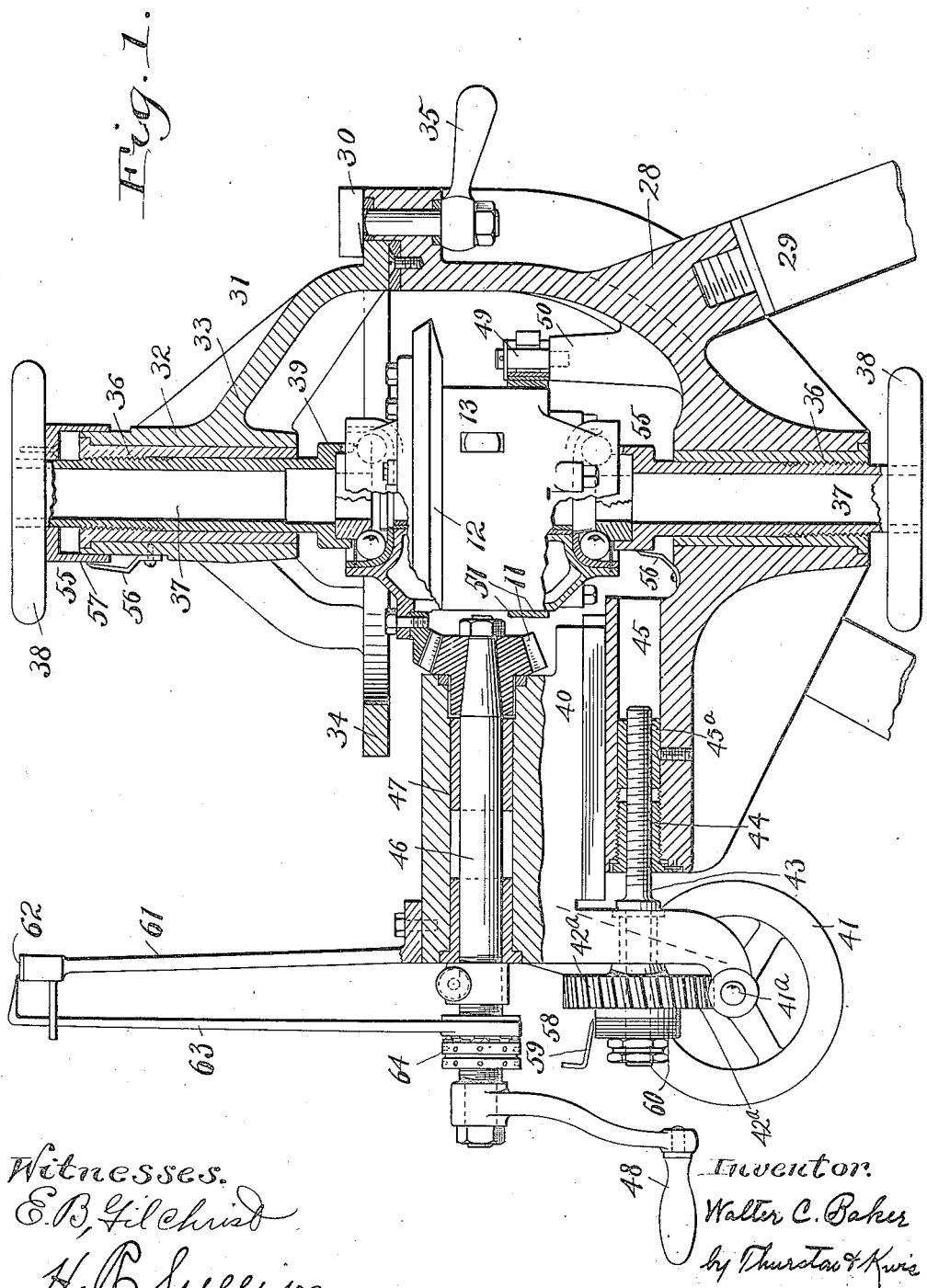

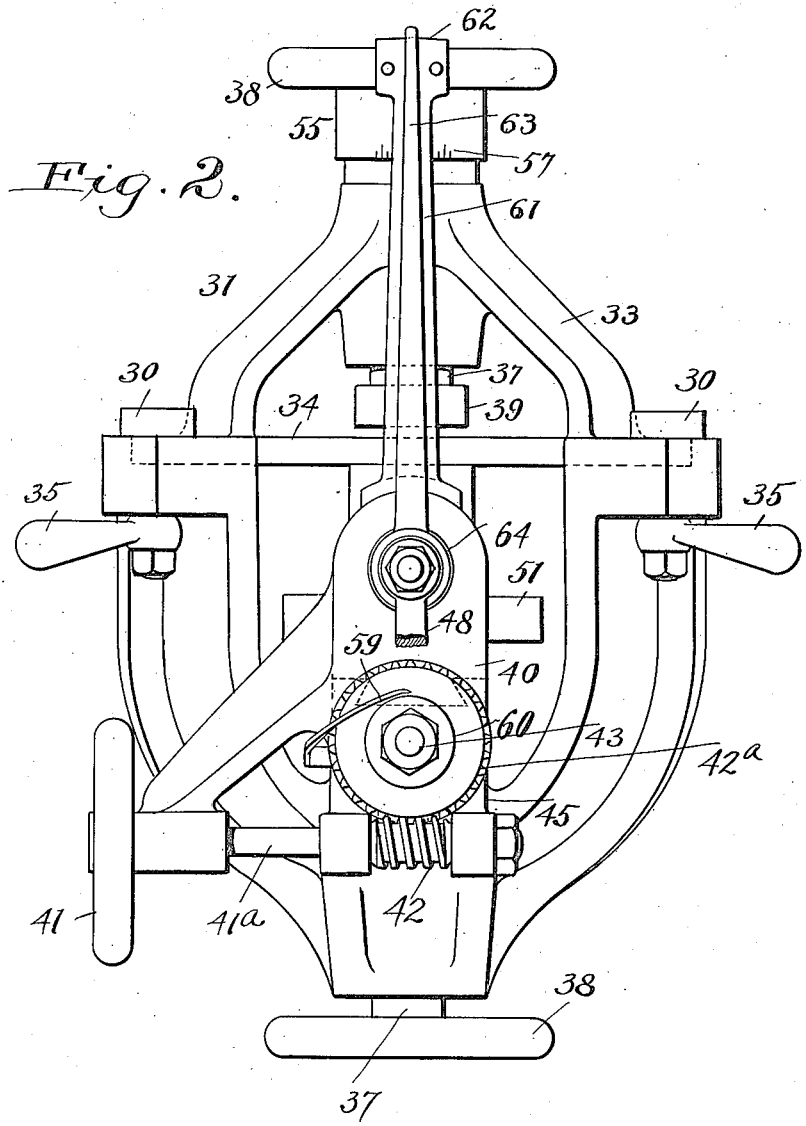

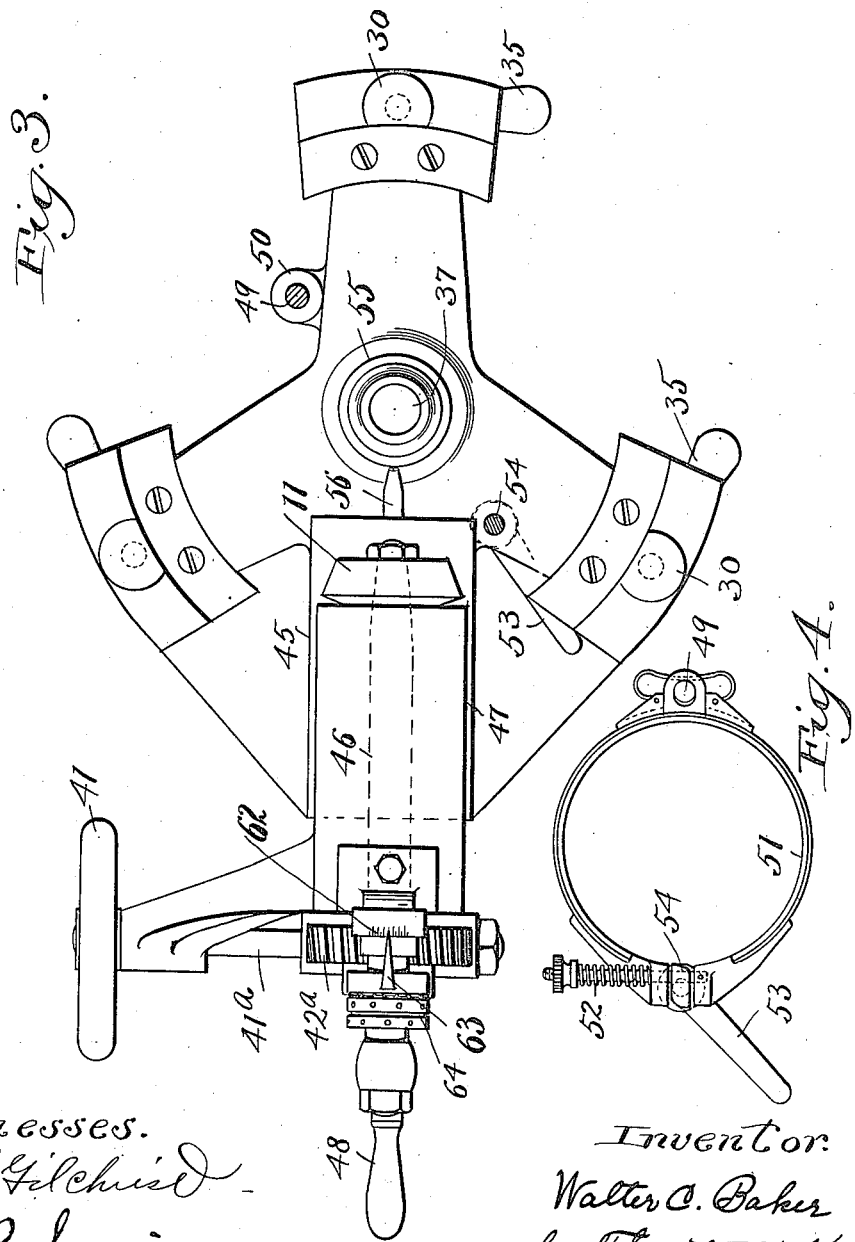

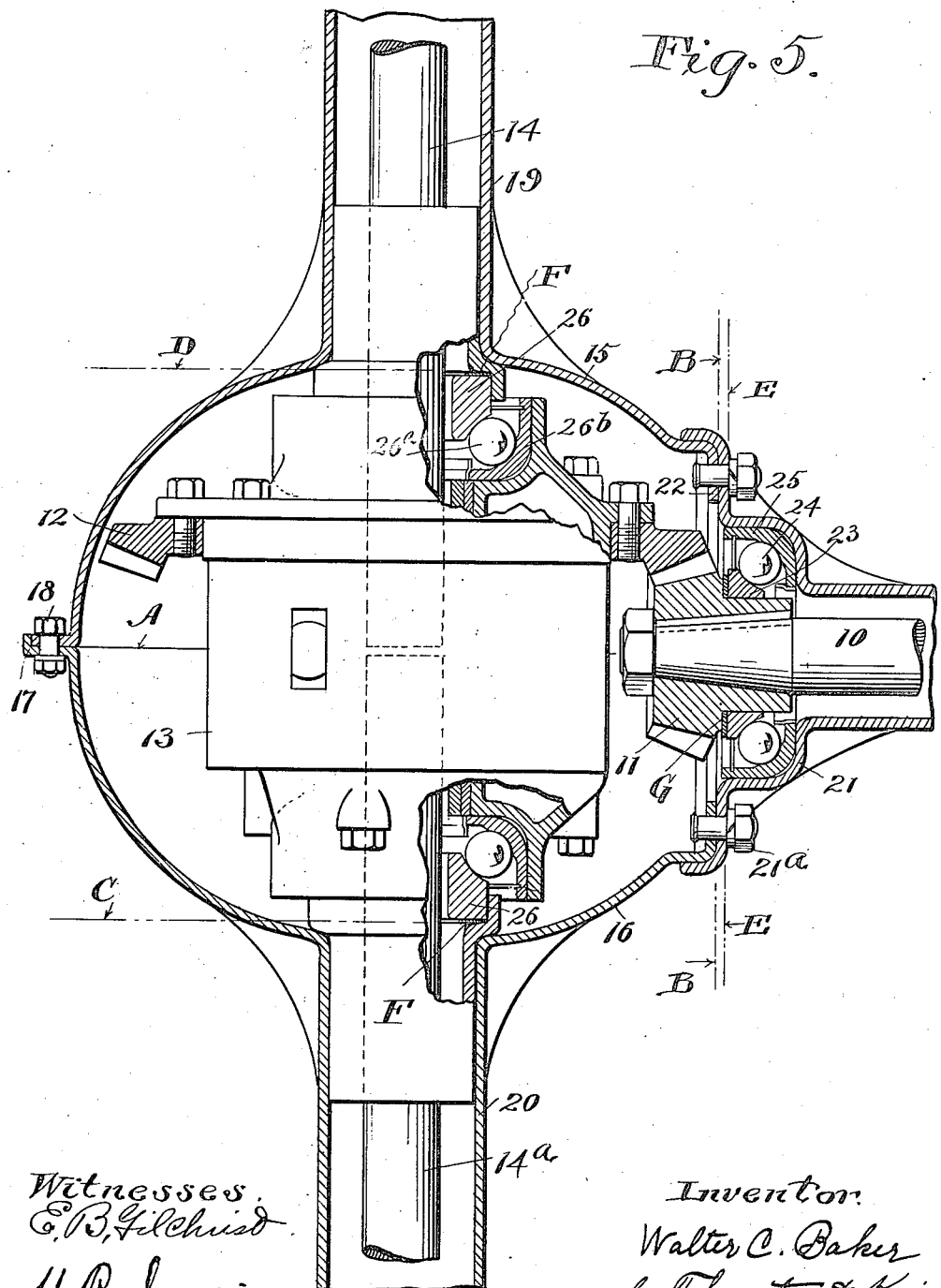

WALTER C. BAKER, OF LAKEWOOD, OHIO.

METHOD OF ACCURATELY LOCATING COÖPERATING GEARS.

1,209,377.          Specification of Letters Patent.      Patented Dec. 19, 1916.

Application filed June 17, 1910. Serial No. 567,372.

*To all whom it may concern:*

Be it known that I, WALTER C. BAKER, a citizen of the United States, residing at Lakewood, in the county of Cuyahoga and State of Ohio, have invented a certain new and useful Improvement in Methods of Accurately Locating Coöperating Gears, of which the following is a full, clear, and exact description.

The present invention relates to a method for determining the correct relative positions of coöperating gears, and particularly for determining the positions of the bevel driving pinion and bevel driven gear of a motor vehicle, so as to obtain the best results in power transmission, smoothness of operation, life, and durability.

It is a well known fact that plain spur bevel gears are correctly located when the points of their pitch and clearance cones meet and when the axes of the cones of the two gears are in the same plane. When thus correctly positioned in relation to each other, the bevel gears form an admirable power transmission agency, smooth and silent in action and durable if made of the proper material suitably treated. On the other hand, if the gears are not properly located, then the bevel gear drive becomes noisy, is full of shocks in action, wears rapidly, and is a constant source of power loss and annoyance.

With the knowledge that the bevel pinion and gear of rear axle constructions demand exact placing, and finding it difficult to machine the gear housings, gear mountings and gears to absolutely correct dimensions which would assure this correct gear placing, automobile manufacturers fitted the parts with screw adjustments by which the positions of the pinion and coöperating gear could be shifted. The obvious result of this adjustable feature was that through the ignorance or carelessness of workmen the gears were misplaced or were shifted by road-shocks and vibrations. Consequently, it became apparent that to secure the proper and best working results from the bevel pinion and gear drive, it was desirable to determine the proper positions of the pinion and gear and to fix them in their proper positions in the factory so that it would be a difficult matter for a workman to change their relative positions.

The bevel gear rear-axle construction includes a dust-proof inclosure consisting of several separable hollow inclosing elements having three openings, one to permit the entrance of a pinion or drive shaft, and the other two, at right angles to the first, to permit the egress of the live axles. In view of the fact that it is almost impossible or at least very difficult to manufacture the elements of gear housings, whether such elements are cast and then machined, or stamped from sheet metal, without there being inaccuracies or nonuniformities in dimensions, it is a difficult matter to determine the proper positions of the pinions and gears relative to one another and to their housing abutments, and to fix them permanently in their proper positions, except by the "cut and try" method which involves excessive added costs and production delays.

One of the objects of the present invention is to provide a method by means of which the proper relative positions of two coöperating gears, particularly of the bevel pinion and gear of a rear axle construction, can be determined, and whereby the gears can be accurately placed and fixed in the housings, regardless of any dimension errors in the component parts of the latter.

A further object is to determine and fix the positions of the pinion and gear without the necessity of special trying and fitting, and without pairing or assembling numbered components in sets to be kept together and fitted by "cutting and trying" so that the faults of one component could be nullified by variations of some other components, and after the relative positions of the gears have been determined, to fix them in their proper positions so that they are not susceptible of adjustment or disarrangement in the hands of careless or incompetent workmen.

Although my invention is not confined in its application to the assembly of rear axle constructions, the latter constitutes a very good field for its use, and I will therefore below describe my invention as I employ the same for this particular purpose. Before taking up the detail description, this preliminary explanation and description may be given.

It is well known that in a rear axle construction the pinion axis and gear axis must be at right angles to each other and must lie in the same plane; when these conditions are met then by moving the pinion inward or outward toward or away from the gear and by moving the gear toward or away from the pinion, the correct relative positions of the gear and pinion can be found. Of necessity, both the pinion and gear must have fixed position-locating abutments in the pinion and gear housings,—hence it is evident that if the pinion and gear can once be correctly placed relative to each other and measurements can be made and recorded to show the actual pinion hub and gear hub positions, while other measurements can be made and recorded of the abutments for the pinion-hub and gear-hub in any given axle construction, then the correct thicknesses of washers to be placed between the hubs and their abutments bringing the pinion and gear into correct positions in the axle assembly can be determined. The above constitute the main features of my improved method for correctly placing the bevel pinion and gear of a rear axle construction.

In carrying out my invention, as applied to rear axle constructions, certain datum surfaces or planes in the gear and pinion housings of a rear axle construction are assumed, and the distance of the pinion-hub and gear-hub abutments from these datum surfaces are determined preferably by caliper measurements. Next, the correct relative positions of the pinion and gear are determined by arranging them on two axes which are in the same plane and have a known angular relation, and by adjusting the gear along its axis toward and away from the pinion, and adjusting the pinion inward and outward along its axis toward or away from the gear until the pinion and gear are in their approximately correct relative positions, which can be determined with accuracy, and next the extent of the adjustments of the gear and pinion are measured in terms comparable with the measurements of the distances of the abutments from the datum planes. From these measurements when certain corrections to be referred to presently are made, the thickness of spacing washers to be placed between the pinion and gear and their abutments to bring the pinion and gear in their proper positions, can be determined.

To determine the correct relative positions of the pinion and gear, I have devised a novel gaging machine in which the bevel pinion and gear, together with the hub or mounting of the latter, can be placed with the gear supported on its own ball bearings, so that the pinion axis intersects the gear axis at right angles, the machine also including means for adjusting the pinion and gear relatively until they are in their best working positions, as well as micrometer measuring appliances by means of which the positions of the pinion and gear may be determined with great accuracy. The machine also has certain other features which will be referred to in the detail description.

The invention may be further briefly summarized as consisting in certain steps of an improved method for determining and fixing the positions of two coöperating gears, hereinafter described.

For the better understanding of my invention, reference is had to the accompanying sheets of drawings in which—

Figure 1 is a partial elevation and partial vertical sectional view, with parts broken away, of the gaging machine, the machine as here shown supporting the driving bevel pinion, and driven gear, of a rear axle construction; Fig. 2 is an end view of the same looking toward the right in Fig. 1, parts being broken away; Fig. 3 is a top plan view with the top portion of the machine removed; and Fig. 4 is a detached view of a friction brake which is employed and is adapted to be placed about the mounting or hub of the gear when it is supported in the machine; Fig. 5 is a partial sectional view and a partial elevation of a portion of the rear axle construction.

Referring first to Fig. 5 wherein I have shown a portion of a rear axle construction of a motor vehicle, 10 represents the pinion shaft or drive shaft which is provided with the bevel driving pinion 11, which meshes with the bevel driven gear 12, the pinion 11 and the gear 12 being the members the positions of which are adapted to be determined and fixed relative to each other, and to the elements of the housing. The gear 12 is supported on or carried by a mounting or hub 13 which in this instance consists of the casing for gears which need not be described, but which, it is understood, drive the live axles 14 and 14$^a$ in a well known manner. The gear 12 and its mounting are inclosed within a housing which in this case consists of two pressed-steel cup-shaped members or portions 15 and 16 having flanges 17 which are secured together by bolts 18, and these cup-shaped portions are provided respectively with axle sleeves 19 and 20, through which the live axles 14 and 14$^a$ extend. The pinion housing includes a pressed steel member 21 which is secured by bolts 21$^a$ to an annular inwardly extending flange 22, one half or approximately one half of which is on each of the cup shaped portions 15 and 16 of the gear housing. The pinion 11 is provided in this case with a hub on which is adapted to be tightly fitted a cone 23 which is engaged by balls 24 supported by a cup 25 in the pinion housing-member 21. The mounting or hub of the gear 12 is supported at opposite ends by cones 26 carried by the two elements of the gear housing, and by ball-bearings 26ª which engage within cups 26ᵇ carried by the end portions of the gear mounting or hub.

One of the main steps in my improved method consists in determining the positions of the gear and pinion hub abutments in the gear and pinion housings. Four datum surfaces can be assumed for determining the location of the abutments, and these surfaces are the meeting faces of the flanges 17 of the two parts of the gear housing, indicated by the line A—A in Fig. 5, and the meeting faces of the flange on the gear housing and the flange on the pinion housing indicated by the line B—B. From the surfaces A—A, the locations of the abutments for the gear ball cones 26, and finally the locations of the ends of the gear ball cones can be determined, while from the datum surfaces B—B, the location of the pinion abutment or of the cone 23, and finally the location of the pinion itself can be determined as will be explained.

After the right and left housing cups 16 and 15 for an axle construction are paired or selected, the distances from the datum surfaces indicated by the line A—A to the line C or to the cone abutment for the right cup is measured, and the distance from the datum surfaces indicated by the line A—A to the line D, or the location of the cone abutment for the left cup is measured, and these measurements are recorded. After the pinion housing element has been selected, the distance from the datum surfaces indicated by the line B—B to the pinion abutment, or to the face of the cone 23 indicated by the line E is measured and recorded.

In case the geometrical center of the flange seat for the pinion housing element is not in the plane A—A the "off center" measurement of the flange seat of either cup 15 or 16 from the datum plane A—A is made and recorded. This measurement is made by an outside micrometer which measures the distance from the outer surface of the flanged seat for the pinion housing to the flanged edge or face A—A of the cup. The "off center" measurement gives the distance of the pinion axis from the datum plane. Also the distance of the outer face of the flange 22 from the center line or axis of the gear 12 is measured and if this measurement is less or greater than the correct or standard distance, the difference is recorded. This measurement gives not only the distance of the datum surface B—B from the gear axis, but gives also the location of the pinion abutment or pinion cone with reference to the gear axis. Either before or after these measurements are made, and of course before the gears have been assembled in the inclosure or gear housings the gear 12 and its mounting and pinion 11 are placed in the gaging machine which I have devised, and which is shown on Figs. 1, 2, 3 and 4. This machine includes a frame comprising a body portion 28 which may be formed from any suitable cast metal and supported on legs 29. This body portion 28 is adapted to receive and to have clamped thereto by clamping members 30, a top member 31 comprising a spider having a vertical hub 32, downwardly and outwardly extending arms 33 which are provided at their lower ends with a bearing ring 34 adapted to be clamped to the top of the body portion 28 by the members 30 which can be turned by suitable handles 35. The body portion 28 of the machine and the hub 32 of the top member of the machine are provided respectively with oppositely disposed vertical openings which receive respectively two bushings 36 in which are mounted two axially movable supporting members 37 for the mounting or hub of the gear 12. In this case the bushings 36 and supporting members 37 have coöperating threaded portions, and the supporting members are adapted to be shifted inwardly and outwardly by rotary hand wheels 38. The supporting members 37 have at their inner ends cup-shaped portions 39 adapted to receive the ball-cones 26 which support the mounting for the bevel gear 12, so that the mounting may be supported by these members 37, on its own bearings, and in a manner such that it may be turned or rotated.

The body portion 28 is also provided with a horizontally movable slide 40 adapted to be shifted in suitable grooves or guides by means of mechanism including a hand wheel 41, which is fixed to a short shaft 41ª having a worm or other gear wheel 42, which meshes with a gear wheel 42ª mounted upon a horizontal spindle 43. This spindle which is supported in a suitable bushing 44 arranged in an opening 45 in the body portion, has a threaded portion which engages a stationary nut 45ª arranged in the opening 45, and held in fixed position by a pin or other device. With this mechanism, by turning the hand wheel 41 and the threaded shaft or spindle 43, the slide 40 will be shifted inwardly or outwardly, depending upon the direction in which the hand wheel 41 is turned. This slide carries a rotary horizontal spindle 46 which is supported in suitable bushings 47 with its axis intersecting the axes of the gear mounting supporting members 37, and arranged at right angles thereto. This spindle is adapted to receive at its inner end the driving pinion 11, (which in a rear axle assembly, as shown in Fig. 5, is mounted on the end of the driving spindle 10,) and at its outer end is provided with a crank or handle 48, by which the spindle may be turned in its bearing bushings. In some instances, the pinion 11 is integral with the shaft 10, and in such case, both the pinion and its shaft will be placed in the gaging machine and will be secured to a slightly shorter spindle 46.

A suitable brake, a detached view of which is shown in Fig. 4, is mounted upon an anchor stud 49 supported in a boss 50 shown in Fig. 1, and this brake includes a stationary annular band 51 adapted to be placed about the gear mounting and to be held tightly in engagement with the same by a tension device 52. The band may be opened or spread by a handle 53, to which is attached a cam or spreading member 54. The purpose of this brake is to afford resistance to the turning of the gear mounting by the crank 48 and by the pinion 11 when the latter is carried by the spindle 46.

Thus, it will be seen that with the gaging machine here shown, by shifting the supporting members 37 simultaneously in one direction or the other, the gear 12 and gear mounting can be shifted upwardly or downwardly so as to move the gear 12 away from or toward the pinion 11, and by turning the hand wheel 41, the pinion can be shifted inwardly or outwardly, toward or away from the gear 12. By properly adjusting the mounting and the pinion along their axes and by turning the crank 48 from time to time so as to rotate the pinion and mounting against the action of the friction brake, the proper working positions of the pinion and gear can be found.

In order that the extent of the vertical adjustment of the gear mounting and of the horizontal adjustment of the pinion may be measured in terms which can be utilized for determining the positions of these members relative to their respective fixed abutments, I have provided for each supporting member 37 a micrometer measuring device 55 consisting of a stationary indicator 56 and a coöperating suitably graduated member 57, which moves with the corresponding hand wheel 38, and for the horizontally movable slide which carries the spindle 46, I have provided a micrometer measuring device 58 consisting of a stationary indicator 59 and a suitably graduated movable member 60, which, in this case, is carried by the spindle 43. These measuring devices are so constructed and graduated, that after the gear mounting and pinion have been adjusted until the gear 12 and the pinion 11 are in proper working positions, the amounts or extent of these adjustments are indicated on the two measuring devices 55 for the supporting members 37 and on the measuring device 58 for the spindle 46 or pinion 11, in terms which are preferably directly comparable with the measurements of the abutment distances from the datum surfaces.

The machine is also provided with a simple device for indicating the back-lash between the pinion and gear when they are in any positions relative to each other, and this indicating device includes an arm 61 fixed relatively to the slide and provided at its outer end with a graduated portion 62, (the graduations being shown in Fig. 3), and an indicator 63 consisting of an arm which is normally loose on the spindle 46, but may be clamped thereto by a suitable clamping device 64, the indicator 63 having at its outer end a pointer which coöperates with the graduated portion of the arm 61. It will be seen that by clamping the indicator 63 to the spindle 46, and by shifting back and forth the handle 48 attached to the spindle, the back-lash of the gear and pinion can be determined at any time.

After the gear and pinion have been adjusted in the gaging machine until said members are in their proper relative positions, it will be a very simple matter to determine the proper position of the gear 12 relative to the gear housing abutments and the proper position of the pinion 11 relative to its abutment in the pinion housing. To determine the correct positions of the gear or of the gear cones 26 in the gear housing, the readings of the micrometer measuring devices 55 are subtracted from the measurements of the abutments' distances from the datum surfaces A—A, proper allowance being made, of course, for the "off center" measurements previously referred to. The difference between the abutment distance of each half of the gear housing from its datum surface A—A, and the reading of the upper or lower measuring device 55, with the "off center" measurement added or subtracted as the case may be, gives the thickness of the washer or washers F to be inserted between such abutment and the corresponding gear cone 26 to properly locate or fix the gear in the housing. Also the correct position of the pinion in the pinion housing can be determined by subtracting from the pinion abutment measurement, the reading of the micrometer measuring device 58, and this difference will give the thickness of the washer or washers to be inserted between the pinion and pinion abutment or pinion cone 23 to fix or properly locate the pinion in the pinion housing, providing the distance of the outer face of flange 22 or the datum line B—B is the correct distance from the axle axis or longitudinal center. If this distance is not correct, the error is corrected by adding or subtracting the same from the reading of the micrometer 58 accordingly as the error is minus or plus, or, in other words, if the measurement shows the distance to be less or greater than the standard or absolutely correct amount.

The micrometer measuring devices of the gaging machine are originally set so that the readings of the measuring devices will be in terms comparable with the measurements of the abutment distances, by placing in the machine in the manner above described the gears of an axle construction known to be accurate and giving to the measuring devices arbitrary readings (after the gears are in proper relative position) such that the difference between these readings and the measurements of the abutment distances for the two gears from the datum surfaces of a certain gear and pinion housing known to be accurate in construction, will be positive. Furthermore, the micrometer measuring devices are originally set so that the differences between the micrometer readings and the abutment measurements for all axle constructions, the positions of the gears of which are adjusted and fixed in this manner, will be positive, taking into account all likely dimension errors. By so setting the micrometer measuring devices with accurate gears in the machine, the micrometer readings for the bevel gears give the distances of the gear cones from the pinion axis or from the datum surfaces A—A since these datum surfaces contain the pinion axis when the housing is absolutely correct, and the micrometer reading for the pinion gives the distance of the pinion end from the datum surface B—B which in an accurate housing is at a certain distance from the gear axis. Therefore when the gears of any rear axle construction are placed in the machine and adjusted, the readings of the measuring devices show the positions of the gear cones and pinion end with reference to the pinion and gear axes respectively, and when these readings are corrected by adding or subtracting the error in the location of the datum surfaces with reference to the gear and pinion axes, said readings will show the positions of the gear cones and pinion end with reference to the datum surfaces.

In some of the claims the parts whose positions relative to the temporary gear axes are determined or measured in the gaging machine are, for the sake of brevity, referred to as the gear ends, by which expression I mean those parts which in the rear axle construction or permanent gear assembly are in juxtaposition to or face the abutments of the housing.

Briefly stated, my method is substantially as follows: Assuming that the micrometer measuring devices of the gaging machine have been properly set or adjusted with reference to standard or accurate gear and pinion housings by placing in the machine a pinion and a gear, together with the mounting and bearings of the latter, the pinion and gear being known to be accurate; and assuming that the three parts of the pinion and gear inclosure and the pinion and gear together with its mounting have been selected and are ready for assemblage with the other necessary parts to form (in this case) a rear axle construction, the distances of the abutments for the gear or gear cones 26 to the datum surfaces A—A or to the flange faces are carefully measured and recorded. Also the "off center" measurement or the location of the geometric center of the pinion housing or the permanent axis of the pinion 11 and of the driving spindle 10 from the datum surfaces A—A is carefully measured and recorded. Also the distance of the pinion abutment from the datum surfaces B—B is measured and recorded, and the distance of the datum surfaces B—B from the permanent axis of the gear 12 is measured and recorded.

Either before or after the measurements above referred to are made, the pinion and the coöperating gear selected for use with the above mentioned housing elements are placed in the gaging machine in the manner previously described and are adjusted back and forth until they are found by the backlash measuring-device to be in their proper working positions, and the readings of the micrometer measuring devices 55 and of the micrometer measuring device 58 are taken and recorded.

To permanently support or locate the pinion and gear in the gear and pinion housings and in their proper relative positions or in the same positions that they were in after the adjustments of the gaging machine were made, washers of proper thicknesses are placed between the gear cones 26 and their respective abutments and between the pinion and its abutment which is, in this case, the cone 23. The thicknesses of the washers to bring about the above result are determined from the above measurements as follows:

If the "off center" measurement is found to be zero, or if the permanent pinion and spindle axis were found to coincide with the datum surfaces A—A, then the readings of the two micrometer measuring devices 55 are subtracted from the abutment measurements for the gear cones 26 to obtain the thicknesses of washers to be placed between the two gear cones and their respective abutments. If, however, the axis of the pinion 11 and of the spindle 10 did not coincide with the datum surfaces A—A, then the readings of the micrometer measuring devices 55 must be corrected. This is done by adding the "off center" measurement to the reading of the one micrometer measuring device 55 and subtracting the same measurement from the reading of the other micrometer measuring device 55,—the addition of the "off center" measurement or the subtraction of the "off center" measurement to or from the reading of say, the upper micrometer measuring device 55, depending upon which side of the datum surfaces A—A the axis of the pinion spindle was found to be.

If it was found that the datum surfaces B—B were located the proper or usual distance from the gear axis, then the thickness of the spacing washer for the pinion 11 is found by subtracting the reading of the micrometer measuring device 58 from the abutment measurement for the pinion 11. If, on the other hand, it was found that the datum surfaces B—B were not located the correct or usual distance from the gear axis, then the reading of the micrometer measuring device 58 must be corrected by adding or subtracting the error in the location of the datum surfaces B—B, depending upon whether the error is a plus or minus quantity, and the thickness of the spacing washer is found by subtracting the corrected reading from the abutment distance.

The various parts of the rear axle can now be assembled into the construction shown in Fig. 5, the washers being selected from lots of graded sizes. When the washers F are placed in the cups which receive the gear cones 26, and when the washer G is placed between the cone 23 and the adjacent face of the pinion, and when the parts are assembled as shown in Fig. 5, the gears will without any adjustment and without any necessity for adjustment be in their proper working positions.

With the method above described, and with the gaging machine which I have devised, the bevel pinion and coöperating bevel gear can be located very quickly and with great accuracy relative to each other and to the housing, in spite of dimension errors or non-uniformities in the different parts. This method above described may be employed for properly fixing the positions of gears other than bevel gears such for example, as spiral gears, and it may be employed for determining and fixing the positions of bevel gears used in other than rear axle constructions, such for example as in jack shaft constructions.

The gaging machine disclosed herein constitutes the subject-matter of a separate application filed by me, Serial No. 619,990, April 10, 1913, and entitled gaging machine.

Having thus described my invention, what I claim is:

1. The method of correctly locating a pinion and gear in the pinion and gear inclosure which consists in measuring the distances of abutments for the pinion and gear respectively from assumed datum surfaces on the inclosure, adjusting the pinion and gear each along one of two properly arranged axes outside the inclosure until the pinion and gear are in their correct relative positions, measuring the extent of the adjustments, and from the abutment measurements and adjustment measurements determining the thickness of spacing members to be placed between the pinion and its abutment and the gear and its abutments.

2. The method of determining the correct positions of two gears in the inclosure for the gears which consists in determining the positions of gear abutments in the inclosure with reference to assumed datum surfaces of the inclosure, determining the position of each gear with reference to the axis of the other gear when said gears are in their correct relative positions outside of the inclosure, determining the positions of the permanent gear axes with reference to the datum surfaces, and thence determining the thicknesses of spacing members to be inserted between the abutments and the adjacent ends of the gears to bring and maintain said gears in their correct positions in the inclosure.

In testimony whereof, I hereunto affix my signature in the presence of two witnesses.

WALTER C. BAKER.

Witnesses:
A. F. KWIS,
A. J. HUDSON.